2,999,045
DERESINATION OF WOOD PULP
Reid Logan Mitchell, Shelton, and Paul Henry Schlosser, deceased, late of Shelton, by Else S. Schlosser, executrix, Shelton, Wash., assignors to Rayonier Incorporated, Shelton, Wash., a corporation of Delaware
No Drawing. Filed July 22, 1953, Ser. No. 369,714
4 Claims. (Cl. 162—77)

This invention relates to refined high-alpha cellulose pulp produced from wood and has for its object the provision of improved high-alpha cellulose pulp and an improved process for the production of the refined cellulose pulp. The improved high-alpha cellulose pulp of the invention (hereinafter called "refined wood pulp" or simply "pulp") is characterized principally by an extremely low content of natural resins, the amount remaining in the pulp approximating closely the level achieved by solvent extraction.

Our invention provides an improved process for the treatment of wood pulp to produce refined pulp which effects an economical and efficient removal of substantially all the natural resins in the aqueous solutions and water used in producing and refining the pulp. In accordance with the process of our invention, we incorporate small amounts of a block copolymer of polyethylene oxide and polypropylene oxide in the water solution used in the digestion or the refining of the pulp, to remove substantially all of the natural resins, leaving in the pulp less than 0.05%, based on the weight of the dry pulp, of such resins as measured by ether extraction. In an especially advantageous embodiment of the invention, we incorporate the block copolymer in the water solution of an alkaline refining or bleaching stage in the production of the pulp.

The term "block copolymer," as used herein, and in the claims will be understood to be the copolymers of polyethylene oxide and polypropylene oxide which may be represented by the formula

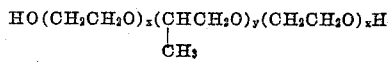

in which $x$ and $y$ have average values for particular copolymers of 10 and 19; 6 and 28; 15.5 and 28; and 106 and 28, respectively. In one especially effective block copolymer, the average values of $x$ and $y$ are 15.5 and 28 respectively, $x$ varying from 11 to 17 depending upon the total molecular weight, and the value of $y$ varying from 26 to 31 depending upon the total molecular weight and the value of $x$. Block copolymers of the aforementioned types are manufactured and sold under the names of Pluronic L–44, Pluronic L–62, Pluronic L–64, and Pluronic F–68. Pluronic L–64, which is belived to have average values for $x$ and $y$ of 15.5 and 28 respectively, is outstandingly effective for the purpose of the invention. In practicing our invention, we may use these block copolymers alone or in admixture.

As used herein, the word "dry" means substantially dry and refers to pulp either bone dry or containing that small moisture content which the pulp, being a hygroscopic substance, has taken up from the air. Roughly, this will refer to pulp containing from zero to 10% of moisture.

Over a period of years increasingly severe refining treatments have been used to produce wood celluloses of higher and higher alpha cellulose content. As a consequence of the increased usage of sodium hydroxide in these refining treatments, the amount of natural resin, as measured by the amount of ether extractable material, has fallen lower and lower, leveling off at about 0.10 to 0.15%.

The natural resins of the wood that survive the processing operations and remain with the refined pulp are usually present in amounts of about 0.15% in highly refined pulp and in larger amounts in less highly refined pulp. In order to remove these resins completely or even to ineffectual amounts, in the order of 0.02 to 0.05% based on the dry weight of the pulp, it would be necessary to resort to solvent extraction, as with ether, methylene chloride or alcoholbenzene. But since solvent extraction is costly, the removal of the resins by such extraction is not at present commercially feasible. Moreover, it has been known that the natural resins react with caustic soda in the viscose process to form surface active agents which have been regarded as beneficial in various stages of the processing. For example, they serve as wetting and lubricating agents, making the cellulose pulp more amenable to processing, and as "anticratering" agents in spinning the resulting viscose, giving improved continuity in the spinning operation. Due to the increased severity of refining, the natural resin level has been reduced to around 0.10 to 0.15%. When the level of resins falls to around 0.10 to 0.15%, it has been the practice to supplement the natural resins with added surface active agents in order to give the pulp satisfactory viscose processing and spinning characteristics.

As a result of our extensive investigations, we have discovered that these residual natural resins actually are detrimental in many respects notwithstanding their surface active properties, principally because they retard the wetting and pentrating of the pulp by caustic steeping liquor, and weaken the filaments made by the viscose process because these resins agglomerate in the viscose and in coagulated filaments causing inhomogeneities in the filament which embrittle and weaken its structure.

We have discovered that the natural resins can be removed from the pulp in the refining operation when using our process by simply washing them out of the pulp to such low levels that they no longer exercise any noticeable effect on the quality of the pulp or in its processing or in subsequent cellulose products. In accordance with our invention, we incorporate in the liquor, for example, of an alkaline refining stage for producing a refined wood pulp, a relatively small quantity of the block copolymer and then wash out of the pulp substantially all of the natural resin and substantially all of the block copolymer itself. It appears that the block copolymer functions by emulsifying the resins or in some other way effects their removal in washing the pulp. This action is surprising in view of the ineffectiveness of other surface active agents in the cationic, anionic or non-ionic categories to remove these resins in a similar washing operation under alkaline conditions. This surprising result can be accomplished by using merely from 0.01 to 0.3% of the block copolymer based on the dry weight of the cellulose.

Although in the preferred operation the nonionic block copolymer is used in the alkaline extraction stage to reduce the natural resin content of the pulp, it nevertheless may be used very effectively in other or all stages of pulp manufacture such as in acid or alkaline digestion, chlorination, hot or cold alkaline extraction, acid hydrolysis, hypochlorite bleaching, chlorite bleaching or even in hot or cold washing stages to reduce natural resin content.

In the commercial production of cellulose ethers, it is customary to pass a sheet of cellulose through a hot mercerizing dip in strong caustic soda. It has been thought that wood pulps produced in the form of soft, absorbent, low density sheets should be suitable for this process, but this is not the case. It has now been found that the amount of residual natural resin existing in the wood pulp is the principal factor determining whether the pulp will be wet and penetrated by the strong caustic liquor in the required few seconds (e.g. less than 10 seconds), or in much longer times measured as many seconds or even in minutes. This behavior in severely inhibiting wetting in strong caustic (e.g. 50% at 25° C. or 73% at 95° C.) is very surprising in view of the fact that ether extractable materials become surface active "wetting agents" and do so act in water or weak caustic soda liquor. The dip test utilizing 50% NaOH at 25° C. conveniently gives the same order of wetting as 73% at 95° C. while having the advantage of greatly exaggerating differences in wetting rate. Both solutions show an entirely different wetting behavior than rayon-type liquors of about 18% NaOH concentration.

If a wood pulp is solvent extracted to remove the natural resin content, it then wets very readily in strong caustic soda liquors and if the resin is progressively reduced from a high level (0.60–0.20%) to a low level (below 0.05 preferably 0.02%) the wetting rate correspondingly improves and the pulp is more advantageously usable commercially in strong caustic dip processes. Wood pulps on the market having wetting times of 60 seconds to 40 minutes may be so improved that with the ether extractable resins below 0.05% they will wet in 3–10 seconds.

As a result of our discovery that by use of block copolymers we can practically eliminate natural resins in a simple washing operation with water or with aqueous alkaline refining liquors or with alkaline bleach liquor, we can produce a superior pulp having wetting properties with strong caustic comparable to the wetting properties of solvent extracted pulp.

The invention is applicable to the treatment of pulp from any suitable woods such as western hemlock, spruce, southern pine, black gum, birch, maple, alder and ash. The wood chips may be subjected to any suitable treatment prior to alkaline refining such as acid sulfite digestion or prehydrolysis treatment. The pulp is usually washed in any convenient manner such as in a blowpit or by drum washers. The washed pulp in aqueous suspension is then chlorinated with elemental chlorine according to conventional practice for the digested pulp. This treatment may be carried out at any convenient pulp consistency. Following chlorination, the pulp is again washed thoroughly with water, using, for example, a rotary drum washer.

The washed pulp is then subjected to an alkaline refining treatment with any suitable alkaline liquor of relatively low caustic content. As the alkaline refining agent, we may use any of the following chemicals, or mixtures thereof, NaOH, $Na_2CO_3$, $Na_2SO_3$ and $Na_2S$. In refining operations requiring the use of $Na_2SO_3$ such liquor would advantageously include also $Na_2CO_3$ with or without NaOH, $Na_2S$ or $Na_2CO_3$ plus $Na_2S$. We prefer to add the block copolymer to the alkaline refining liquor in an amount varying, say, from 0.25 to 0.5 pound per ton of dry pulp and to carry out the alkaline refining with the added block copolymer.

After completion of the refining treatment and washing, the pulp may be bleached to a high degree of brightness by any method that will not impair the high quality of the pulp, such as by sodium or calcium hypochlorite, aqueous solutions of chlorine dioxide or acidified sodium chlorite. Instead of adding the block copolymer to the alkaline refining liquor as above, we may add it to the bleach liquor. In any case, after bleaching, the pulp is thoroughly washed with water and the resins are substantially all carried away with the wash water.

An alkaline digestion of the type described was carried out with about 0.5 pound of Pluronic L-64 per ton of dry pulp and the ether extract in the pulp was reduced to about 0.02%, a level not previously attainable except by solvent extraction. While we can effectively remove the resins from the pulp by using from one-quarter to one-half pound of such block copolymer per ton of dry pulp, larger amounts may be used but with no apparent advantage or disadvantage.

When the refined pulp is to be processed into viscose, cellulose ether or cellulose acetate, it is advantageous to replace the natural resins with surface active agents and the block copolymers are very effective for this purpose. There are advantages in certain instances in adding to the washed pulp a block copolymer similar to that used in resin removal, as when producing pulp for viscose processing. This low natural resin cellulose is particularly suitable for hot strong caustic dipping as is practiced in the production of cellulose ethers and will wet-out in less than 10 seconds when dipped in 50% NaOH at 25° C. Our refined cellulose pulp is further particularly suited for the production of tire cords with a superior level of fatigue life and, with a subsequently added replacement of block copolymer, shows a combination of superior properties with respect to viscose filterability, anticratering, yarn color, and cord fatigue. We may, however, add any suitable surface active agents of the type frequently used as pulp additives. For example, we may add these agents just prior to drying on hot pressure rolls to diminish inactivation due to drying which is important in the production of cellulose acetate. When the pulp is heated with a polyethylene type surface active agent prior to drying, the pulp has superior acetate reactivity, as compared with a pulp similarly treated without the agent. The improved refined pulp of the invention not only has a low natural resin content and superior wettability but it is soft and yields finished products superior to any previously realized with wood pulp.

Table I shows the comparison between two identical pulps treated in the same refining sequence, one treated without Pluronic L-64 and the other treated with 0.1% Pluronic L-64, based on the dry weight of the pulp, added to the pulp in the sodium hydroxide extraction and bleach stages.

*Table I*

|  | Pulp refined without L-64 added in any stage | Pulp refined with 0.1% L-64 |
| --- | --- | --- |
| Reg. Alpha | 88.2 | 89.1 |
| Beta | 6.6 | 5.8 |
| Gamma | 5.2 | 5.1 |
| N.D. Alpha | 91.7 | 91.9 |
| Beta | 3.1 | 2.9 |
| Gamma | 5.2 | 5.2 |
| KOH | 24.0 | 24.0 |
| Cuene I.V. | 4.15 | 4.14 |
| Carboxyl | 15.2 | 14.5 |
| Ether extract | 0.26 | 0.09 |

Table II shows the wetting time to penetrate sheets of cellulose pulp with 50% sodium hydroxide aqueous solutions at 25° C. containing various amounts of natural resins.

*Table II*

|  | Wetting Time, Seconds | |
| --- | --- | --- |
|  | in 50% NaOH at 25° C. | in 73% NaOH at 95° C. |
| Pulp A containing 0.10% ether extract | 60 | 13 |
| Pulp A extract reduced to 0.02% using Pluronic L-64 | 4 | 1 |
| Pulp A ether extracted to remove all resins | 2 | <1 |

Table III shows the effect on the wetting time with 50% caustic soda solutions at 25° C. for pulps containing various percentages of natural resins as measured by the ether extractable resin based on the dry weight of the pulp.

Table III

| Pulp | Ether Extract, Percentage | Wetting Time in 50% NaOH at 25° C. |
|---|---|---|
| 1 | 0.59 | 35 Min. |
| 2 | 0.20 | 170 Sec. |
| 3 | 0.16 | 120 Sec. |
| 4 | 0.12 | 90 Sec. |
| 5 | 0.11 | 80 Sec. |
| 6 | 0.10 | 60 Sec. |
| 7 | 0.09 | 42 Sec. |
| 8 | 0.08 | 45 Sec. |
| 9 | 0.07 | 25 Sec. |
| 10 | 0.05 | 10 Sec. |
| 11 | 0.04 | 6 Sec. |
| 12 | 0.03 | 3 Sec. |
| 13 | 0.02 | 2 Sec. |
| 14 | 0 | 2 Sec. |

Table IV shows the effect of the natural resins in pulp which is converted into viscose and spun to form tire cord. It is clear from comparative data that the residual or contained natural resins have a pronounced detrimental effect on tire cord fatigue life. Although Pluronic L-64 does not completely remove the natural resin, it removes the resins to such a low level that they do not exercise an appreciable adverse effect on the strength of the filaments.

Table IV

| | Natural Resin Content | Tire Cord Fatigue Life |
|---|---|---|
| Pulp A (Birch): | | |
| (1) Unextracted | 0.36 | 4 |
| (2) Unextracted+0.5% L-64 | 0.36 | 44 |
| (3) Solvent extracted | 0 | 202 |
| (4) Extracted using L-64 plus added 0.1% L-64 | 0.12 | 200 |
| Pulp B (Cedar): | | |
| (1) Unextracted | 0.12 | 25 |
| (2) Unextracted+0.1% L-64 | 0.12 | 100 |
| (3) Solvent extracted | 0 | 300 |
| (4) Extracted using L-64 plus added 0.1% L-64 | 0.04 | 290 |

This application is a continuation-in-part of the application of Paul Henry Schlosser and Reid Logan Mitchell, Serial No. 289,672, filed May 23, 1952, now abandoned.

What is claimed is:

1. The process of producing improved high-alpha cellulose pulp which comprises washing a previously digested wood pulp with an aqueous liquor having incorporated therein from 0.01 to 0.3% by weight based on the weight of the bone dry pulp of a block copolymer represented by the formula

in which the average values of $x$ are about 15.5 and the average values of $y$ are about 28 and removing in the aqueous liquor substantially all of the natural resins and the block copolymer, leaving in the pulp not over 0.05% of the natural resins based on the dry weight of the pulp.

2. The process of producing improved high-alpha cellulose pulp which comprises treating a chlorinated wood pulp in an alkaline refining stage with aqueous liquor having incorporated therein from 0.01 to 0.3% by weight based on the weight of the bone dry pulp of a block copolymer represented by the formula

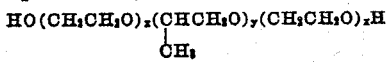

in which the average values of $x$ are about 15.5 and the average values of $y$ are about 28, and then washing the pulp to remove in the wash water substantially all of the natural resins and block copolymer, leaving in the pulp not over 0.05% of the natural resins based on the dry weight of the pulp.

3. The process according to claim 2 in which the pulp contains not more than 0.02% of the natural resins based on the dry weight of the pulp.

4. The process of producing improved high-alpha cellulose pulp which comprises treating wood pulp subjected to an alkaline extraction stage with an aqueous solution containing from 0.01 to 0.3% by weight based on the weight of the bone dry pulp, of a block copolymer represented by the formula

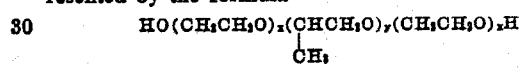

in which the average values of $x$ are about 15.5 and the average values of $y$ are about 28, and washing the pulp with water, thereby removing from the pulp substantially all of the natural resins and the block copolymer, leaving in the pulp not over 0.05% of natural resins based on the dry weight of the pulp.

References Cited in the file of this patent

UNITED STATES PATENTS

| | | |
|---|---|---|
| 1,847,311 | Schur et al. | Mar. 1, 1932 |
| 1,970,578 | Schoeller et al. | Aug. 21, 1934 |
| 2,072,487 | Snyder | Mar. 2, 1937 |
| 2,166,540 | Bailey | July 18, 1939 |
| 2,481,693 | Schlosser et al. | Sept. 13, 1949 |
| 2,674,619 | Lundsted | Apr. 6, 1954 |
| 2,692,877 | Gray et al. | Oct. 26, 1954 |
| 2,716,058 | Rapson et al. | Aug. 23, 1955 |
| 2,790,795 | Thomas et al. | Apr. 30, 1957 |
| 2,814,569 | Schlosser et al. | Nov. 26, 1957 |